UNITED STATES PATENT OFFICE.

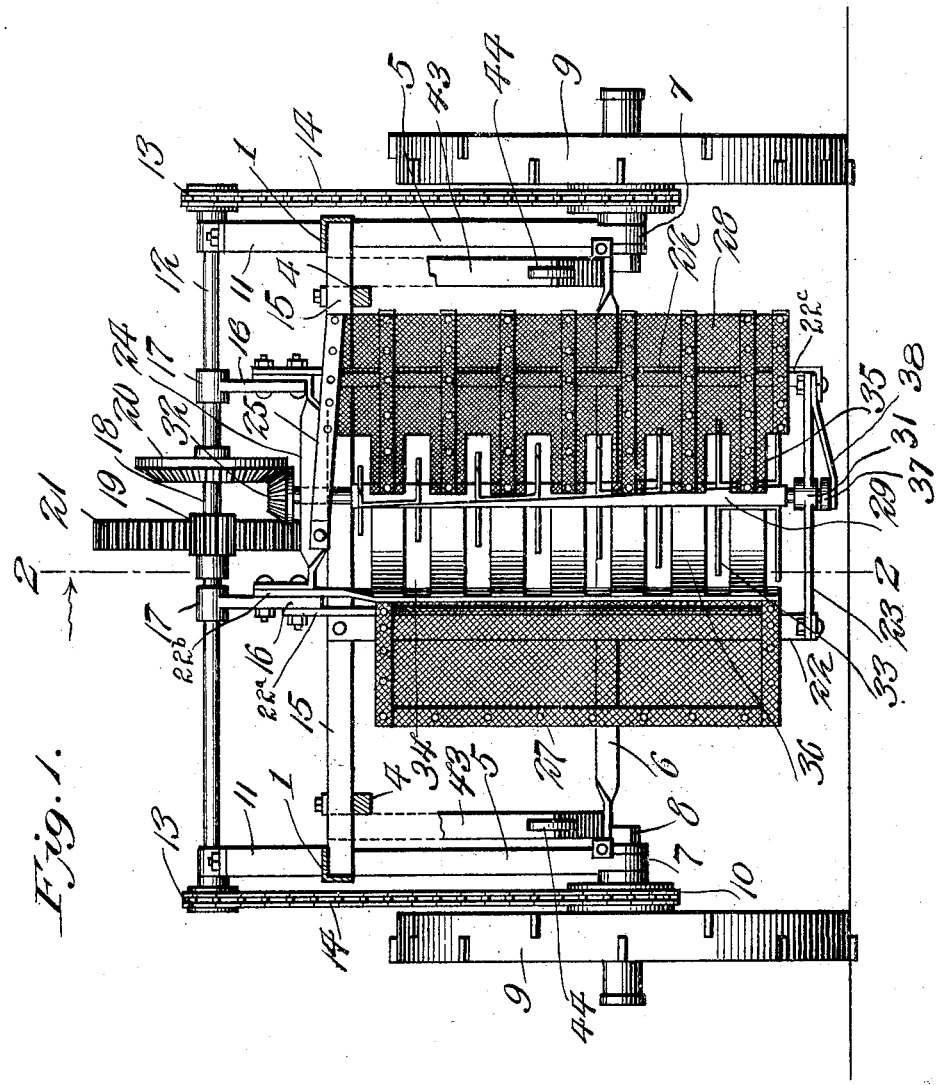

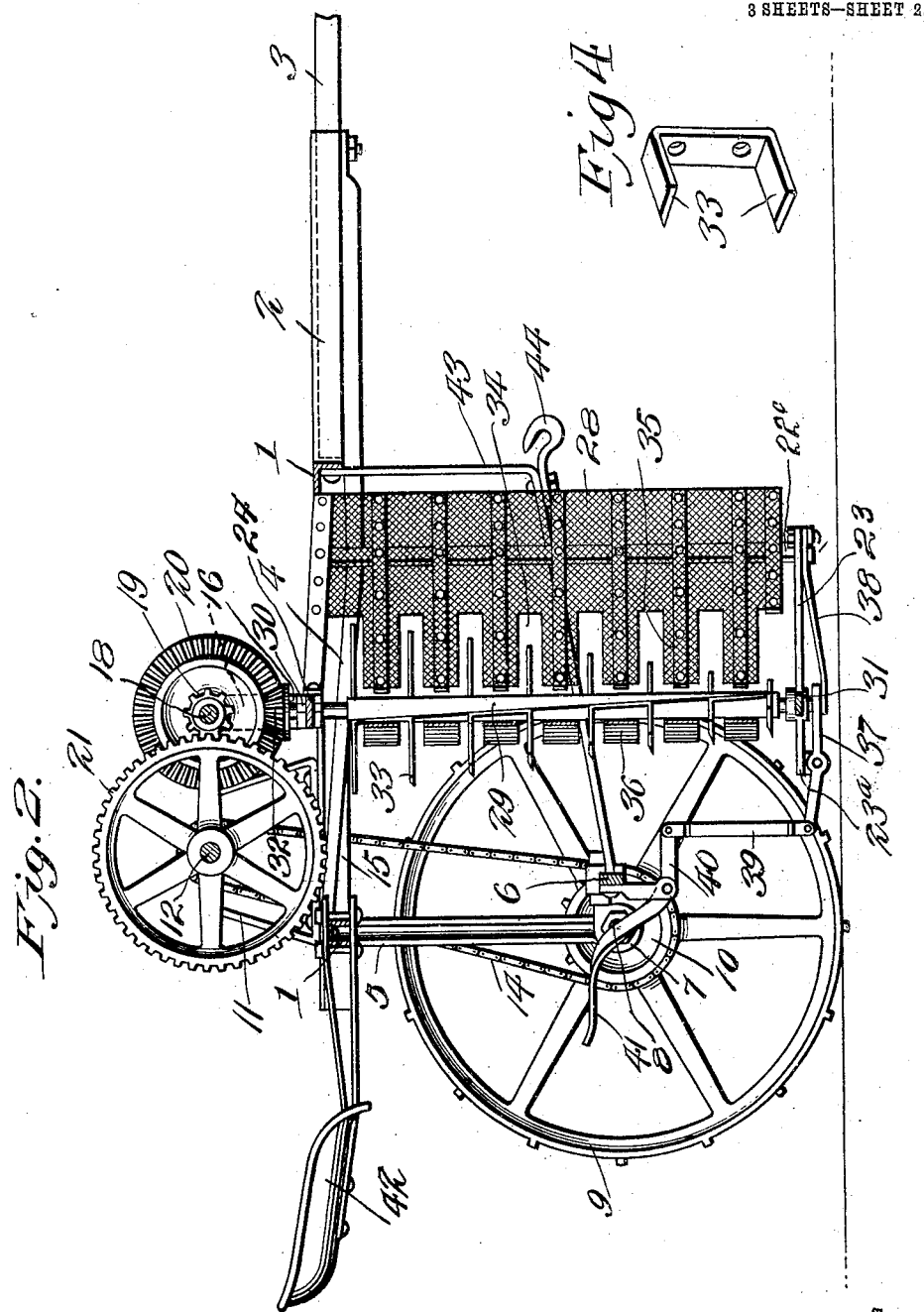

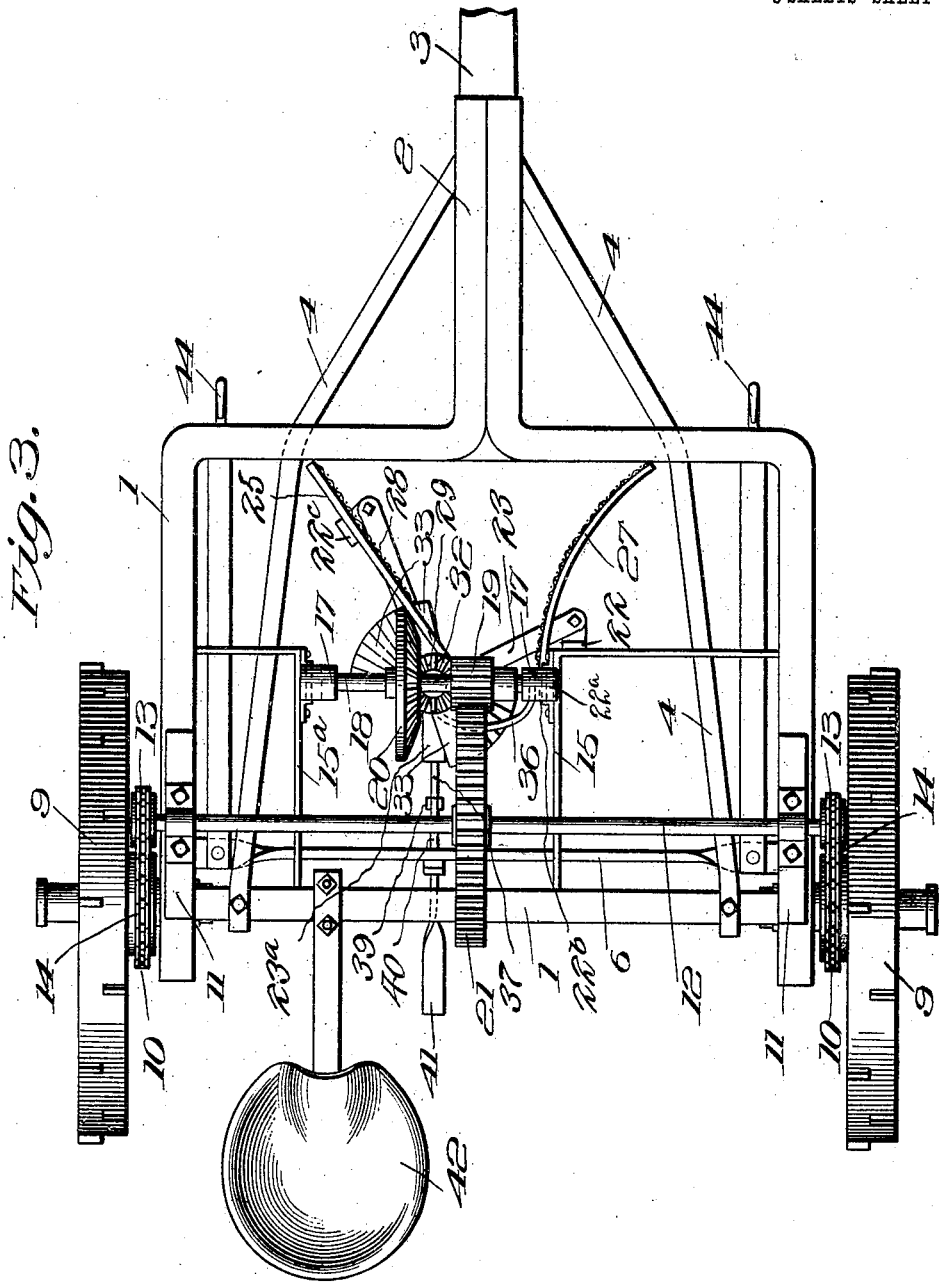

ORLANDO N. OWEN, OF FORSYTH, GEORGIA.

STALK-CUTTER.

No. 920,636.  Specification of Letters Patent.  Patented May 4, 1909.

Application filed June 10, 1908. Serial No. 437,775.

*To all whom it may concern:*

Be it known that I, ORLANDO N. OWEN, a citizen of the United States, residing at Forsyth, in the county of Monroe and State of Georgia, have invented new and useful Improvements in Stalk-Cutters, of which the following is a specification.

This invention relates to a machine for cutting into small pieces the standing stalks of cotton, corn, etc., after harvesting of the crop, the object of the invention being to provide a simple, efficient and comparatively inexpensive construction of machine of this character adapted to be drawn across the field and having cutting mechanism adapted to be conveniently thrown into and out of action by the driver.

The invention consists of the features of construction, combination and arrangement of parts hereinafter fully described and claimed, reference being had to the accompanying drawings, in which:—

Figure 1 is a vertical transverse section through the machine taken on a line in advance of the cutting mechanism. Fig. 2 is a vertical longitudinal section on the line 2—2 of Fig. 1. Fig. 3 is a top plan view of the machine. Fig. 4 is a detail view of one of the cutting knives.

Referring to the drawings, 1 designates an upper, horizontal rectangular main frame preferably constructed of angle iron and comprising front, rear and side bars, the front bar being provided with forward extensions 2 coöperating to form a partial socket for the rear end of a draft tongue 3, which latter is connected with and stayed from the rear portion of the main frame by longitudinal braces 4 converging at their forward ends and bolted or otherwise suitably fastened to the said extensions 2 and tongue 3. Depending from the rear of the said main frame are side standards 5 connected at their lower ends by a transverse bar 6 and provided with bearings 7 for spindles or stub shafts 8 on which are revolubly mounted traction wheels 9, the hub of each of which carries a sprocket wheel 10.

Mounted upon the main frame are bearing brackets 11 in which is journaled a transverse drive shaft 12 carrying at its ends sprocket pinions 13 connected with the aforesaid sprocket wheels 10 by drive chains 14.

Secured to the opposite sides of and extending into the main frame are elbow brackets 15 and 15$^a$, from which extend upright arms 16 provided at their upper ends with bearings 17 for a countershaft 18 on which is mounted a pinion 19 and a beveled gear 20, the said pinion meshing with a drive gear 21 on the shaft 12.

Secured to and depending from the transverse and longitudinal arms of bracket 15 are vertical bars or standards 22, 22$^a$ and 22$^b$, and disposed in advance of said bars in the opposite side of the longitudinal center of the frame is a vertical bar or standard 22$^c$. The bars or standards 22 and 22$^c$ are connected at their lower ends by a V-shaped bracket or cross bar 23, and the brackets 15 and 15$^a$ are connected at their upper ends by a cross bar 24, from which a diagonal brace 25 extends to and supports the upper end of the bar 22$^c$. Secured at its rear edge to and between the bars or standards 22$^a$ and 22$^b$ is a stalk guide 27, comprising a suitable metallic frame and a body of woven wire or other reticulated material, while secured to the standard 22$^c$ and at its upper end to the brace 25 is a stalk guide 28 composed of cross strips fixed to said standard and a body of woven wire or other reticulated material secured to the said strips. These stalk guides 27 and 28 project outwardly and forwardly from their supporting parts in divergent relation, so that they converge inwardly and rearwardly to guide the standing stalks to the cutters in the operation of the machine as it is drawn across the field.

A vertical shaft 29 is journaled at its upper and lower end in suitable bearings 30 and 31 in the bars or cross-pieces 24 and 23, in which bearings it is adapted to both rotate and slide vertically, and at its upper end said shaft carries a bevel pinion 32 meshing with the bevel gear 20. The shaft carries a series of horizontally disposed cutting knives 33 projecting laterally therefrom, said series being so arranged as to extend spirally around the circumference of the shaft, said knives being arranged at different elevations upon the shaft, and adapted in the forward motion of the machine to rotate with the shaft and cut the standing stalks of corn into small pieces. The shaft is arranged in rear of and on a line between the rear edges of the converging guides 27 and 28, which latter serve to prevent lateral deflection of the stalks during the cutting action of the knives thereon. The knives are preferably formed in superposed pairs by bending a single strip of steel into U-form, to provide a body portion pivotally secured to the shaft and upper and lower cutting blades, as shown. The rear edge of the guide 28 is cut away to form slots 34 through which the cutting knives are adapted to rotate and also to provide between the slots guard fingers 35 to retain the stalks in position while they are being acted upon by the knives. The supporting bar 22$^b$ of the guide 27 also carries a series of curved or segmental guard strips 36 which extend therefrom in rear of the shaft and coöperate with the fingers 35 for the purpose described, said guard strips being spaced apart to form passages through which the cutting knives rotate, as will be readily understood. Hence, it will be seen that in the forward movement of the machine, the stalks will be drawn by the guides into position to be acted upon by the cutting knives, which sever the same into small pieces, the stalks being stayed while they are being cut by the knives by the guard fingers and strips.

The cutter shaft 29 normally receives rotary motion through the intermeshing engagement of the pinion 32 with the gear 20 which is driven by the interposed gearing from the drive shaft 12. The shaft has longitudinal movement in its bearings 30 and 31 and tends to drop by gravity and is supported in operative position by the lower forward end of a lever 37 in which it is journaled, said lever being fulcrumed upon an extension 23$^a$ from the vertex portion of the bracket 23, on which the bearing 31 is also formed. The said forward end of the lever is held from downward movement by a pressure spring 38 fastened to the cross bar 23, which spring operates to hold the shaft supported and to maintain the pinion 32 in engagement with the gear 20, so that normally the cutter shaft will be driven during the forward motion of the machine.

The rear end of the lever 37 is connected by a link 39 with the forward end of an operating lever 40 pivotally supported upon the cross-bar 6 and having its opposite end formed to provide a treadle or foot-piece 41 disposed below and in convenient position relative to the driver's seat 42 fastened to the rear cross-bar of the main frame so that it may be depressed by the foot of the driver. Upon the depression of the foot-piece it will be understood that the lever 37 will be operated to swing its forward end downward against the pressure of the spring 38, whereby the cutter shaft will be caused to drop or will be drawn downward to withdraw the pinion 32 from engagement with the gear 20, thus stopping the operation of the cutting mechanism. Upon the release of the foot lever the parts will be restored to normal position by the spring 38. Any suitable means for locking the lever 40 in adjusted position may be employed. Angle brackets 43 are fastened at their terminal ends to the upper front cross-bar of the main frame and to the bar 6 and carry draft hooks 44 for the attachment of the swingle-trees to which the draft animals are attached.

From the foregoing description, the construction and mode of operation of the apparatus will be readily understood, and it will be seen that a simple type of apparatus is provided in which the cutting mechanism is adapted to be thrown into and out of operation at will and which in action is adapted as the apparatus is drawn across the field to gather and cut the standing stalks into a number of small pieces.

The apparatus is equally effective in operation for cutting the stalks of corn, cotton and those of other plants of like character.

Having thus fully described the invention, what is claimed as new is:—

1. A stalk cutter comprising a wheeled frame including drive gearing, stalk guides supported by said frame, a vertical shaft slidably and rotatably mounted and carrying cutters, gearing between said cutter shaft and the drive gearing and adapted to be thrown into and out of operation by a vertical sliding movement of said shaft, and means for adjusting the shaft vertically.

2. A stalk cutter comprising a wheeled frame including drive gearing, stalk guides supported by said frame, a vertical shaft slidably and rotatably mounted and carrying cutters, lever mechanism for sliding the shaft vertically, gearing between said shaft and the drive gearing and adapted to be thrown into and out of action by the vertical movement of said shaft, and a spring operating to support the shaft in normal position.

3. A stalk cutter comprising a supporting frame, traction wheels carrying said frame, drive gearing operated by the wheels, a vertical frame carried by said supporting frame and embodying diverging guides and sets of spaced guards at the rear of the guides, a vertical shaft slidably and rotatably mounted in said vertical frame and carrying cutters adapted to rotate through the spaces between the guards, gearing between said shaft and the drive gearing adapted to be thrown into and out of engagement by the vertical movement of the shaft, lever mechanism for supporting the shaft, and a spring arranged to normally hold the shaft at the limit of its upward movement.

In testimony whereof I affix my signature in presence of two witnesses.

ORLANDO N. OWEN.

Witnesses:
R. L. WILLIAMS, Jr.,
A. N. HOWARD.